Feb. 14, 1967  W. B. WHITE  3,303,539
FLEXIBLE CORD AND FASTENING MEANS
Filed April 5, 1965

INVENTOR.
WILLIAM B. WHITE
BY
Barlow & Barlow
ATTORNEYS

United States Patent Office 3,303,539
Patented Feb. 14, 1967

3,303,539
FLEXIBLE CORD AND FASTENING MEANS
William B. White, Stonington, Conn., assignor to Greene Plastics Corporation, a corporation of Rhode Island
Filed Apr. 5, 1965, Ser. No. 445,646
2 Claims. (Cl. 24—16)

This invention relates to a means of fastening a flexible member such as a cord or chain to provide a loop such or as might be used to fasten a cord which encircles a package to maintain the same snugly about the package.

Heretofore, special formations have been provided to cooperate with bead-like formations upon a cord for fastening the parts together, such arrangement requiring some special formations of parts peculiar to the locking arrangement.

This invention contemplates the fastening between bead-like formations along any part of the string of bead formations throughout the extent of a flexible cord-like member by merely pressing the parts together where the fastening is to be formed and without any special formations, the cord parts being merely angled one with relation to the other so that they may be pressed into locking relation.

In carrying out this invention, I provide a flexible member such as a cord or chain and form fixedly upon it solid bulk formations or projecting knobs having generally curved exteriors such as spheres or arcuate exteriors, although in some cases these may have flat sides, which I generally refer to as beads, the particular shape not being critical, these beads being fixed upon the flexible member at certain spaced distances. The distances between the beads must, however, be such that when two pair of beads are positioned at generally right angles to each other, they cannot be passed freely across the plane of the cord joining them to cause their cord members to contact, and a second essential is that there be some resiliency between the beads and the cord-like members so that the beads when pressed together cause some parts to elastically give, permitting the two pair to pass one another and cause the cords to be contacted and distorted slightly so that the resiliency will cause the two pair of beads or four beads to contact, and yet they will not return through the path of movement without pressure in the return direction and thus will form a fastening without a knot. Such fastening may be released by a force opposite to that in which the locking arrangement was provided. A more simple way of providing the required elasticity is by forming the cord-like member of some material having elastic properties, such as nylon, while the bead-like members may be formed of some plastic which may be molded more or less fixedly upon the nylon member in the spaced relation desired. These bead-like members may be relatively non-elastic, and elasticity provided previously in the cord-like member or the bead-like members may be elastic and the cord-like member relatively non-elastic or each may be slightly elastic.

With reference to the drawings, 10 designates a cord which may be nylon of $20/1000$ diameter, although this particular dimension is not critical. The nylon is of such a character as to be slightly elastic, and there is firmly attached to this nylon cord a series of beads 11, 12, 13 and 14 which may be formed of a plastic and molded about the cord so as to firmly attach each bead to the cord 10. These beads are relatively non-elastic and may be located along a cord of indefinite length or of a length to act as a tie about a package or a string of beads about the neck or for many applications. The beads here shown are of spherical shape, although as above indicated various shapes may be provided. In this particular spherical shape the cord passes through the center line or diameter of the spheres and the arrangement is one which may be very inexpensively produced, such as in an injection mold. In some cases the cord-like member may be non-elastic and the beads of an elastic plastic, in which case the same conditions set out below must be observed.

Figure 1:
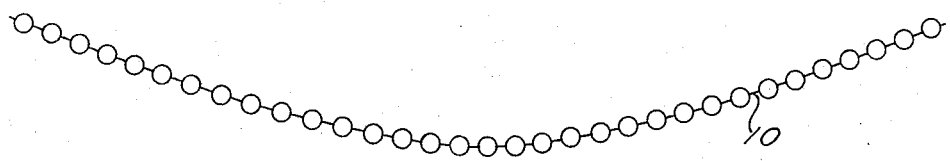
FIG. 1 is a plan view of a cord having a plurality of beads fixedly formed thereon.
Figure 2:
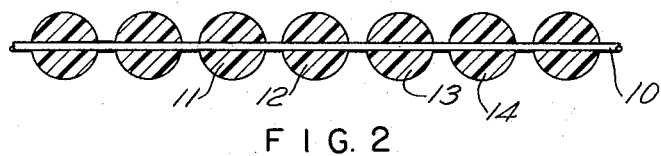
FIG. 2 is a sectional view through a portion of the beads fixed upon the cord-like member.
Figure 3:
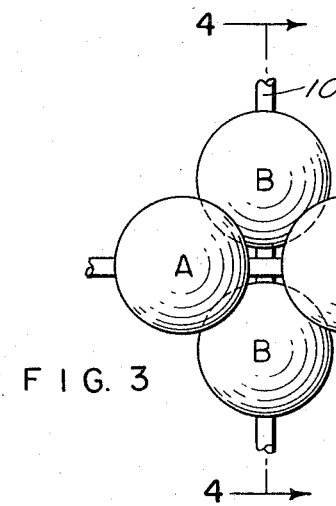
FIG. 3 is a plan view showing two portions of the cord with two pair of beads disposed at generally right angular relations and in a position to be forced into a fastening relation.
Figure 5:
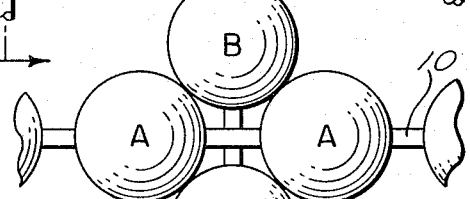
FIG. 5 is a plan view of the beads of FIG. 3 in the act of being forced together.

The relationship of the sphere diameter to the space between the spheres is of importance and must be established such that without any tension on the cord extending between the spheres, one pair of connected spheres when positioned at right angles to another pair could not be superimposed and interconnected with the other pair in the same plane. Thus, as will be seen in FIG. 3, if the spheres AA were superimposed upon the spheres BB, they would overlap as shown in FIG. 3 and could not be positioned in the same plane as seen in FIG. 5 without distorting the cords which extend between them, or at least one of them, or without distorting the spheres themselves. Thus, this important relation between the size of the beads and the space between them must exist for the operation of the method of fastening which is here disclosed.

Figure 4:
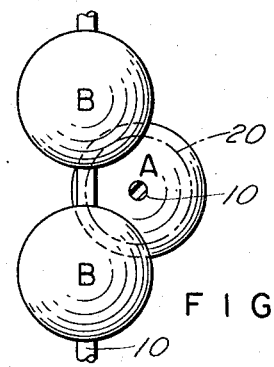
FIG. 4 is an edge view of the beads as shown along the line 4—4 of FIG. 3 before being forced together.
Figures 6, 8:
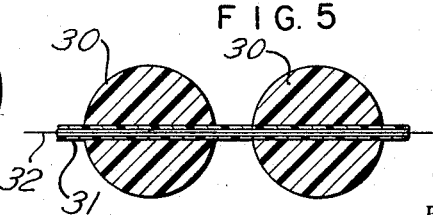
FIG. 6 is a view similar to FIG. 4 after the pairs of beads have been forced together and are in a locked relationship.
FIG. 8 is a sectional view of a modified construction.

It will be apparent that if the relationship such as shown in FIGS. 3 and 4 exists and it is desired to form a lock by movement of one pair of spheres or beads BB with relation to the other pair of spheres or beads AA, then either the spheres or the cord which extends between the pairs of spheres must give in order that this may occur. Either the cord or the spheres or both may give in order that the relationship such as shown in FIG. 6 may occur after the beads BB with relation to the beads AA have had a sufficient force placed upon them to cause some elasticity of either the beads or the cord to have occurred so that one pair of spheres may be passed across the other pair of spheres and contact will exist on the other side of the spheres along the dot dash line shown. In this arrangement the cords which extend between the pairs of beads are in engagement and are bent more sharply. As the elasticity which permitted the passage of one pair of beads past the other pair of beads tends to recover, the beads are held in contact, and yet this elasticity is insufficient to cause the beads to return past one another to the original relationship such as shown in FIGS. 3 and 4.

Figure 7:
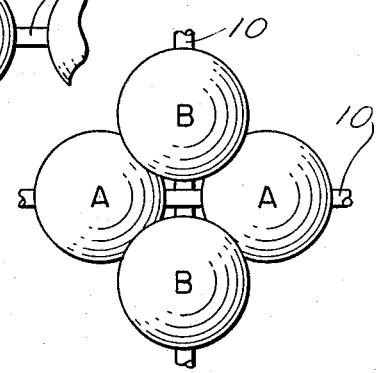
FIG. 7 is a plan view of the beads as shown in FIG. 6.

It may be explained that an imaginary center line between the pair of spheres AA as shown in FIGS. 3 and 4 has passed through the imaginary center line through the spheres BB in the FIGS. 6 and 7. Also it may be clear that the circle where contact occurs designated 20 as shown in FIG. 4 has passed to the other side of the imaginary center line between the spheres BB from the position shown in FIG. 4 to the position shown in FIG.

6 where the circle where contact occurs is designated 21. It will also be apparent that with this point of contact located as shown in FIG. 6 that the tension on the interconnecting cord is lessened once the two pair of beads have been interlocked beyond the point at which they are in the same plane as shown in FIG. 5. This produces a stable union which will remain firm with or without tension on the standing or normal relation of the cords.

By this arrangement a fastening may be very quickly and easily performed and one in which a release of the fastening may be likewise easily and quickly performed, and wherever a flexible cord has been used and heretofore secured by means of knotting, this arrangement may be utilized. Various uses come to mind such as shoe laces, package ties, closure for containers, and marine and military applications.

In some cases, such as in the hanging of a picture where limited elongation is desirable, beads 30 may be molded on a tubular nylon cord member 31 and a non-stretchable wire 32 will extend through the tubular nylon cord member, thus allowing some elasticity of the cord 31 between the beads 30—30 while limiting the overall extensibility of the strand as a whole between two points.

I claim:

1. A flexible locking device comprising a cord-like member, a plurality of bead members fixed on said cord member in spaced relation to each other, said bead members being of such a size relative to the space between them that one pair of bead members on said cord member is prevented from being freely passed at generally right angles to another pair of bead members on said cord member to cause the cord members to engage, at least one of said members being provided with sufficient elasticity so that the one pair of bead members may be forced at right angles past the other pair of bead members to cause said cord members to engage so that the four bead members of said two pair contact and remain in contact to lock the cord member parts together by the tending of said elasticity to return the parts which permitted the forcing of the parts into such relation.

2. A flexible locking device as in claim 1 wherein said elasticity is in the cord-like member.

References Cited by the Examiner

UNITED STATES PATENTS

| 1,423,280 | 7/1922 | Urich. | |
|---|---|---|---|
| 2,281,108 | 4/1942 | Montmartin | 63—29 |

FOREIGN PATENTS 83,035  10/1956  Netherlands.

WILLIAM FELDMAN, *Primary Examiner.*

J. L. JONES, *Examiner.*